United States Patent [19]

Ohta et al.

[11] Patent Number: 4,870,860
[45] Date of Patent: Oct. 3, 1989

[54] DIRECT-HEATED FLOW MEASURING APPARATUS HAVING IMPROVED RESPONSE CHARACTERISTICS

[75] Inventors: Minoru Ohta, Okazaki; Kazuhiko Miura, Aichi; Seizi Huzino, Anjo; Kenji Kanehara, Aichi; Tadashi Hattori, Okazaki, all of Japan

[73] Assignee: Nippon Soken, Inc., Nishio, Japan

[21] Appl. No.: 163,164

[22] Filed: Feb. 25, 1988

Related U.S. Application Data

[63] Continuation of Ser. No. 828,452, Feb. 11, 1986, abandoned.

[30] Foreign Application Priority Data

Feb. 14, 1985 [JP] Japan .................................. 60-25232
Feb. 19, 1985 [JP] Japan .................................. 60-29286
Feb. 25, 1985 [JP] Japan .................................. 60-34413

[51] Int. Cl.⁴ .............................................. G01F 1/68
[52] U.S. Cl. ................................. 73/204.26; 73/118.2
[58] Field of Search ................. 73/204, 118.2, 204.26

[56] References Cited

U.S. PATENT DOCUMENTS

| | | |
|---|---|---|
| 3,975,951 | 8/1986 | Kohama et al. . |
| 3,996,799 | 12/1976 | van Putten .............................. 73/204 |
| 4,320,655 | 3/1982 | Kammermaier et al. . |
| 4,325,253 | 4/1982 | Romann ................................ 73/204 |
| 4,345,465 | 8/1982 | Gruner et al. . |
| 4,393,577 | 7/1983 | Imai . |
| 4,425,792 | 1/1984 | Kohama et al. ....................... 73/204 |
| 4,433,576 | 2/1984 | Shih et al. ............................. 73/204 |
| 4,445,369 | 5/1984 | Stoltman et al. . |
| 4,448,070 | 5/1984 | Ohyama et al. ...................... 73/204 |
| 4,498,337 | 2/1985 | Gruner .................................. 73/204 |
| 4,501,144 | 2/1985 | Higashi et al. . |
| 4,513,615 | 4/1985 | Sazo et al. ............................ 73/204 |
| 4,554,829 | 11/1985 | Sumal .................................. 73/204 |
| 4,594,889 | 6/1986 | McCarthy . |
| 4,677,850 | 7/1987 | Miura et al. ......................... 73/204 |

FOREIGN PATENT DOCUMENTS

| | | |
|---|---|---|
| 19135 | 4/1980 | European Pat. Off. . |
| 5814023 | 7/1981 | Japan . |
| 58-55762 | 4/1983 | Japan . |
| 2039051 | 10/1979 | United Kingdom . |
| 2043264 | 1/1980 | United Kingdom . |
| 2094985 | 3/1982 | United Kingdom . |
| 2134266 | 1/1984 | United Kingdom . |

*Primary Examiner*—Herbert Goldstein
*Attorney, Agent, or Firm*—Cushman, Darby & Cushman

[57] ABSTRACT

In a direct-heated flow measuring apparatus including a substrate having a film resistance pattern and a supporting member for supporting the substrate, the supporting member has good heat dissipation characteristics. Provided between the substrate and the supporting member is a heat transfer throttling portion.

25 Claims, 17 Drawing Sheets

AIR

Fig.IOA
Fig.IOC
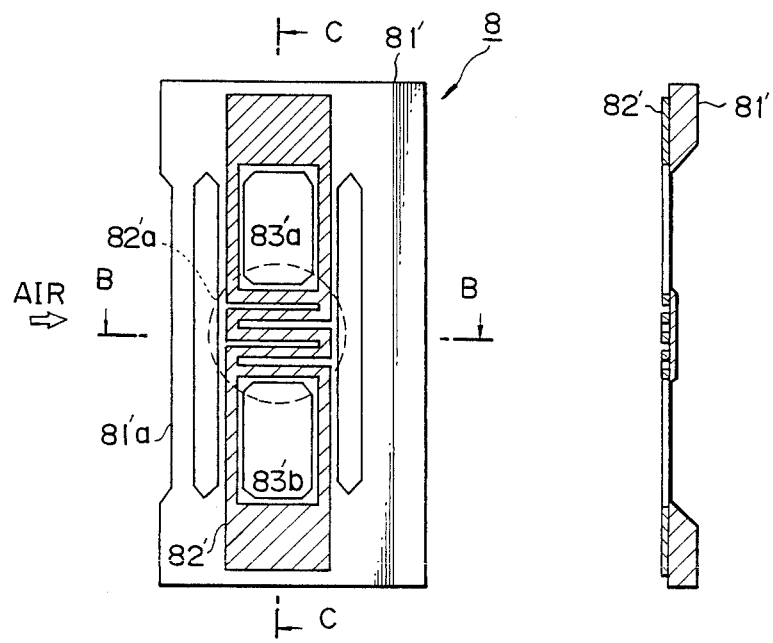
Fig.IOB
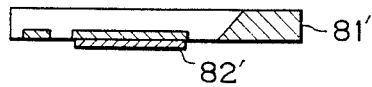

DIRECT-HEATED FLOW MEASURING APPARATUS HAVING IMPROVED RESPONSE CHARACTERISTICS

This is a continuation of application Ser. No. 828,452, filed Feb. 11, 1986, which was abandoned upon the filing hereof.

BACKGROUND OF THE INVENTION (1) Field of the Invention

The present invention relates to a direct-heated flow measuring apparatus having a film resistor which serves as a temperature detecting means as well as an electric heater. Such a direct-heated flow measuring apparatus can be used, for example, for measuring the flow rate of engine intake air.

(2) Description of the Related Art

Generally, in an internal combustion engine, the amount of intake air is one of the most important parameters for controlling the fuel injection amount, ignition timing, and the like. A gas-flow measuring apparatus, i.e., an airflow meter, is provided for measuring the same. One of the more common prior art airflow meters is the vane-type, which is, however, disadvantageous in scale, response speed characteristics, and the like. Recently, airflow meters having temperature-dependent resistors have been developed, which are advantageous in scale, response speed characteristics, and the like.

There are two types of airflow meters having temperature-dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor (temperature-compensating resistor) on the upstream side is used for detecting the temperature of non-heated air. The current flowing through the heater resistor is controlled for a constant difference in temperature between the two temperature-dependent resistors, thereby detecting the voltage applied to the heater resistor as the mass flow rate of air.

In this heater-type airflow meter, if no temperature-compensating resistor upstream is provided and the current of the heater resistor is controlled for a constant temperature of the downstream temperature-dependent resistor, the voltage applied to the heater resistor is detected as the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor (temperature-compensating resistor) for detecting the temperature of non-heated air. Thus, the current flowing through the film resistor is controlled for a constant difference in temperature between the film resistor and the temperature-compensating resistor, thereby detecting the voltage applied to the film resistor as the mass flow rate of air. In this direct-heated type airflow meter, too, if no temperature-compensating resistor is provided and the current of the heater resistor is controlled for a constant temperature of the film resistor, the voltage applied to the film resistor is detected as the volume flow rate of air.

Since the film resistor of the direct-heated type airflow meter serves as a temperature-detecting means for heated air, that is, no additional temperature detecting means for heated air is necessary, the direct-heated type airflow meter is smaller in size than the heater-type airflow meter.

In the direct-heated type airflow meter, the film resistor may consist of an insulating substrate such as a ceramic substrate or monocrystalline silicon substrate, a film resistance pattern of platinum (Pt), gold (Au), etc. on the insulating substrate, and a heat-resistant resin on the resistance pattern.

Usually, the response characteristics and dynamic range of the direct-heated type airflow meter are dependent upon the heat mass and adiabatic efficiency of the film resistance pattern, which serves not only as a heating means but also as a temperature detecting means. In order to obtain the most excellent response characteristics and largest dynamic range, the film resistance pattern should be ideally in a completely floating state in the air stream. In the prior art, however, the film resistor including the film resistance pattern has had an approximately definite width over the lengthwise direction thereof. Accordingly, the adiabatic efficiency is relatively low, thus reducing the response characteristics and dynamic range of the heat-directed airflow meter.

To alleviate this problem, a direct-heated type airflow meter may be suggested in which an aperture is provided between the heating and temperature detecting portion of the substrate including the film resistor and its supporting member of the substrate, thereby creating a throttling effect on the heat transfer, and thus increasing the adiabatic efficiency of the heating and temperature detecting portion and improving the response speed and dynamic range of the airflow meter.

Note that, usually, the heat transfer throttling portion has a small cross-section in order to obtain a further adiabatic efficiency.

However, even if such a heat transfer throttling portion is provided, some heat is still transmitted to the supporting member and as a result, it takes a long time for the heat transmitted to the supporting member, such as a ceramic having bad dissipation characteristics, to become stable, which means that the airflow meter has a bad response characteristic. Also, since the connections from the substrate to a stay within a duct are usually conventionally carried out by lead terminals (pins), the heat of the heating and temperature-detecting portion of the substrate is transmitted via the lead terminals to the duct. In other words, the adiabatic effect of the substrate is small, and accordingly, the heat loss is large, thereby also deteriorating the response characteristics of the airflow meter.

Further, in the conventional direct-heated airflow sensor for detecting the mass flow rate of air, the film resistance pattern as the heater and temperature-detecting portion and the temperature-compensating resistor are disposed at quite different positions. For example, the film resistance pattern is provided within the duct, and the temperature-compensating resistor is provided outside of the duct. Therefore, due to the difference in heat capacity between the film resistance pattern including its supporting system and the temperature-compensating resistor including its supporting system, the transient temperature characteristics of the system of the film resistance pattern are different from those of the system of the temperature-compensating resistor. As a result, the difference in temperature between the film resistance pattern and the temperature-compensating resistor during a transient state is fluctuated, thereby generating an error in the measured flow rate of air.

SUMMARY OF THE INVENTION

It is a principal object of the present invention to provide a direct-heated flow measuring apparatus having improved response characteristics.

It is another object of the present invention to provide a direct-heated flow measuring apparatus having a small error of a measured flow rate.

According to the present invention, in a direct-heated flow measuring apparatus including a substrate having a film resistance pattern and a supporting member for supporting the substrate, the supporting member has good heat dissipation characteristics. Provided between the substrate and the supporting member is a heat transfer throttling portion. Also, an adiabatic member is inserted between the film resistance pattern and the supporting member, and wire bonding is imposed as the electrical connections between the film resistance pattern and the supporting member. As a result, since heat transmitted to the supporting member is positively dissipated to the fluid such as an airstream via a supporting member such as aluminium or copper having good heat dissipation characteristics, the heat transmitted to the supporting member becomes stable promptly, thereby improving the response characteristics of the flow rate sensors. Also, since the substrate is supported by the adiabatic member, and the bonding wires are thin as compared with the lead terminals (pins), the heat loss of the substrate becomes small, thereby improving the accuracy of detection of the flow rate, and thus further improving the response characteristics.

Further, if a temperature-compensating resistor is provided in the heat-directed flow measuring apparatus, the film resistance pattern and the temperature-compensating resistor have the same configuration, the same substrate, and the same supporting member. As a result, the transient temperature characteristics of the system of the film resistance pattern are the same as those of the system of the temperature-compensating resistor. Therefore, the fluctuation of the difference in temperature between the film resistance pattern and the temperature-compensating resistor during a transient state is small, and accordingly, an error in the measured flow rate is small.

Other objects, features and characteristics of the present invention, as well as the methods and operation and functions of the related elements of the structure, and the combination of parts and economies of manufacture, will become apparent upon consideration of the following description and the appended claims with reference to the accompanying drawings, all of which form a part of the specification, wherein like reference numerials designate corresponding parts in the various figures.

BRIEF DESCRIPTION OF THE DRAWINGS

The present invention will be more clearly understood from the description as set forth below with reference to the accompanying drawings, wherein:

FIG. 10A is a plan view of another example of the film resistor of FIGS. 3, 4, and 5;

FIGS. 10B and 10C are cross-sectional views taken along the lines B-C and C-C, respectively, of FIG. 10A;

DESCRIPTION OF THE PREFERRED EMBODIMENTS

Figure 1:
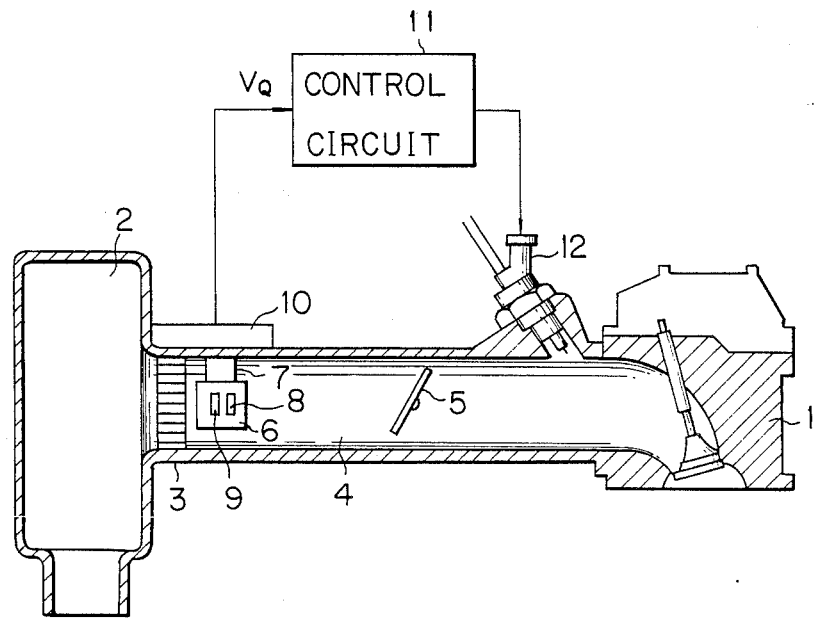
FIG. 1 is a schematic diagram showing the overall configuration of an internal combustion engine including a direct-heated type flow measuring apparatus according to the present invention.

In FIG. 1, which illustrates the overall configuration of an internal combustion engine including an air flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The flow measuring apparatus is provided in the intake air passage 4 between the rectifier grid 3 and the throttle valve 5.

The flow measuring apparatus includes a sensing portion inside of the intake air passage 4 and a sensing circuit 10 outside of the intake air passage 4. The sensing portion includes a measuring tube (or duct) 6 fixed by a stay 7 to the intake air passage 4. A film resistor (film resistance pattern) 8 and a temperature-compensating resistor 9 for detecting the temperature of non-heated air are both provided inside of the duct 6. However, the temperature-compensating resistor 9 is substantially unaffected by the heat generated from the film resistor 8. The film resistor 8 and the temperature-compensating resistor 9 are connected to the sensing circuit 10 mounted on a hybrid board.

The sensing circuit 10 controls the current flowing to the film resistor 8 to generate heat for a constant difference in temperature between the film resistor 8 and the temperature-compensating resistor 9. Also, the sensing circuit 10 generates an output voltage $V_Q$ and transmits it to a control circuit 11, which includes, for example, a microcomputer. The control circuit 11 also receives various kinds of detecting signals such as an engine speed signal Ne (not shown) and an engine coolant temperature signal THW (not shown) and controls the valve opening time period of a fuel injection valve 12 and the like.

Figure 2:
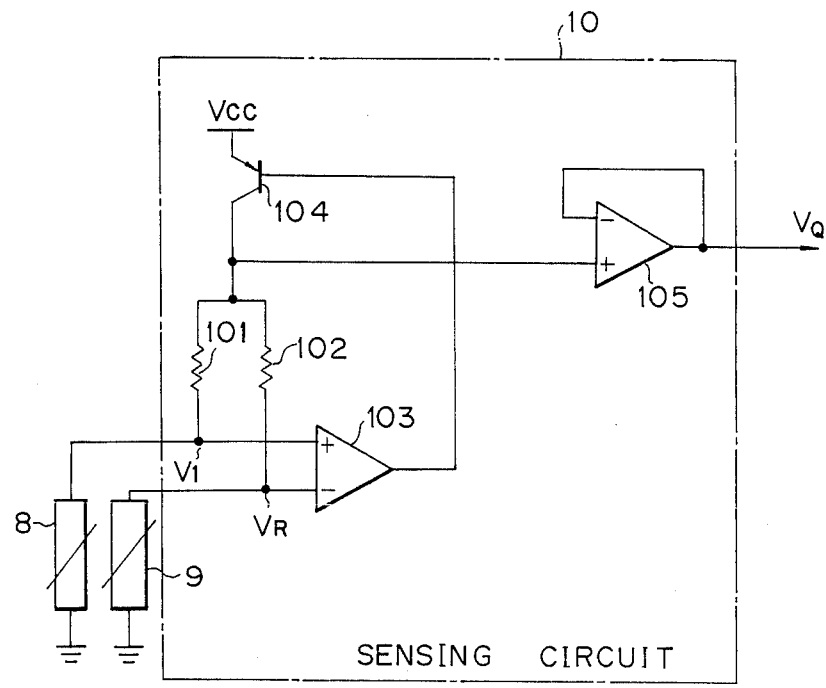
FIG. 2 is a circuit diagram of the sensing circuit of FIG. 1.

The sensing circuit 10 of FIG. 1 will be explained with reference to FIG. 2. In FIG. 2, the sensing circuit 10 includes resistors 101 and 102 which form a bridge circuit with the film resistor 8 and the temperature-compensating resistor 9; a comparator 103; a transistor 104 controlled by the comparator 103; and a voltage buffer 105. The sensing circuit 10 operates as follows. When the amount of air flowing through the intake air passage 4 increases, thus reducing the temperature of the film resistor 8, which is, in this case, a resistance element such as a platinum resistance having a positive temperature coefficient, the resistance value thereof decreases so as to satisfy the following condition:

$$V_1 < V_R$$

where $V_1$ is the potential at the node between the resistor 101 and the film resistor 8 and $V_R$ is the potential at the node between the resistor 102 and the temperature-compensating resistor 9. As a result, the output potential of the comparator 103 is reduced, thereby increasing the conductivity of the transistor 104. Therefore, the heat generated by the film resistor 8 is increased and, simultaneously, the collector potential of the transistor 104 is increased, so that the output voltage $V_Q$ of the voltage buffer 105 is also increased.

Contrary to this, when the amount of air flowing through the intake air passage 4 decreases, thus increasing the temperature of the film resistor 8, the resistance value thereof increases so as to satisfy the following condition:

$$V_1 > V_R.$$

As a result, the output potential of the comparator 103 is increased, thereby decreasing the conductivity of the transistor 104. Therefore, the heat generated by the film resistor 8 is decreased and, simultaneously, the collector potential of the transistor 104 is decreased, so that the output voltage $V_Q$ of the voltage buffer 105 is also decreased.

Thus, feedback control is performed upon the temperature of the film resistor 8 for a constant difference in temperature between the film resistor 8 and the temperature-compensating resistor 9, which, in this case, detects the temperature of ambient air. Thus, the output voltage $V_Q$ of the output buffer 105 indicates the amount of air flowing through the intake air passage 4.

Figure 3:
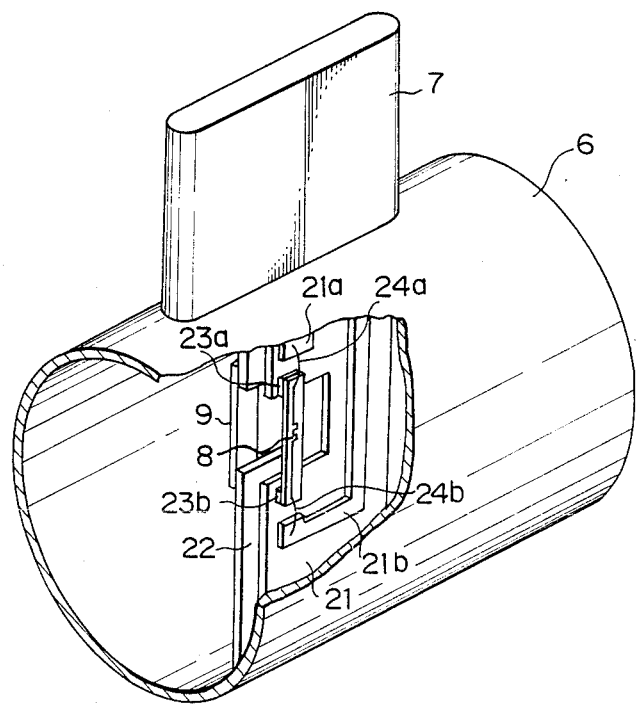
FIGS. 3, 4, and 5 are partially cutaway, perspective views illustrating first, second, and third embodiments of the, direct-heated flow measuring apparatus according to the present invention.

In FIG. 3, which illustrates a first embodiment of the present invention, the film resistor 8 and the temperature-compensating resistor 9 are fixed to supporting members 21 and 22, respectively, arranged in parallel with respect to the airstream. The film resistor 8 is fixed via adiabatic members 23a and 23b to the supporting member 21, and, in this case, the adiabatic members serve as heat transfer throttling portions for the film resistor 8, which serves as an electric heater as well as a temperature-detecting means. The adiabatic members 23a and 23b for the heat transfer throttling portions are made of material having a small specific heat and a small heat conductivity, such as ceramic, polyimid resin, quartz, or glass, and accordingly, they also serve as electrically insulating members. Therefore, the film resistor 8 and electrodes 21a and 21b formed on the supporting member 21 are electrically connected by electric conductive wires 24a and 24b by wire bonding. Note that the electrodes such as 21a are adhered to the supporting members such as 21 by heat-resistant adhesives.

Further, according to the present invention, the supporting member 21 is made of a metal such as aluminium or copper having a large thermal conductivity and a small specific heat. Therefore, the heat transmitted from the film resistor 8 via the adiabatic members 23a and 23b as the heat transfer throttling portions to the supporting member 21 is promptly dissipated to the airstream. That is, most of the heat generated by the film resistor 8 is dissipated from the film resistor 8 itself due to the presence of the adiabatic members 23a and 23b, and one part of the heat is transmitted via the adiabatic members 23a and 23b to the supporting member 21. However, this part is also dissipated into the airstream. Therefore, heat transmitted via the duct 6 and the stay 7 to portions other than the airstream is remarkably reduced.

Note that, in order to make the transient temperature characteristics of the system of the film resistor 8 conform with those of the system of the temperature-compensating resistor 9, the film resistor 8 and the temperature-compensating resistor 9 are of the same substrate material, the same heat capacity, and the same dimension, and are fixed by the same method with adiabatic material (not shown) to the supporting members 21 and 22 which are the same as each other.

Note that, if the transient temperature characteristics of the system of the film resistor 8 are different from those of the system of the temperature-compensating resistor 9, the balance of the bridge circuit of FIG. 2 is destroyed, thereby generating an error in the detection of a measured flow rate.

Further, in FIG. 3 since the film resistor 8 and the temperature-compensating resistor 9 are provided on separate substrates and are apart from each other, the heat amount generated by the film resistor 8 has little affect on the temperature-compensating resistor 9.

Figure 4:
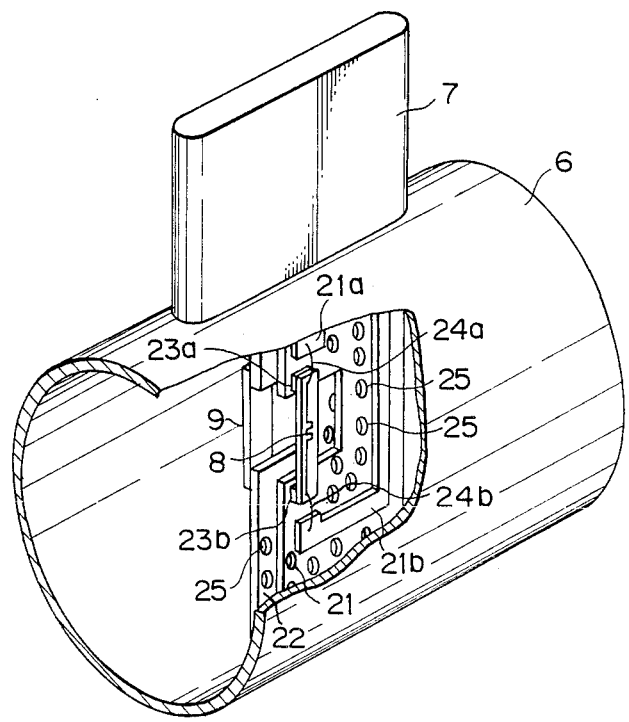

In FIG. 4, which illustrates a second embodiment of the present invention, apertures 25 for dissipating heat are added to the elements of FIG. 2. Thus, the heat dissipation characteristics of the supporting member 21 are further improved, and as a result, the heat transmitted from the film resistor 8 via the adiabatic members 23a and 23b as the heat transfer throttling portions to the supporting member 21 is promptly dissipated into the airstream. Therefore, heat transmitted via the duct 6 and the stay 7 to portions other than the airstream is further remarkably reduced.

Note that, in order to make the transient temperature characteristics of the system of the film resistor 8 conform with those of the system of the temperature-dependent resistor 9, the same number of heat dissipation apertures 25 are also provided at the same positions in the supporting member 22 by which the temperature-compensating temperature 9 is supported.

Figure 5:
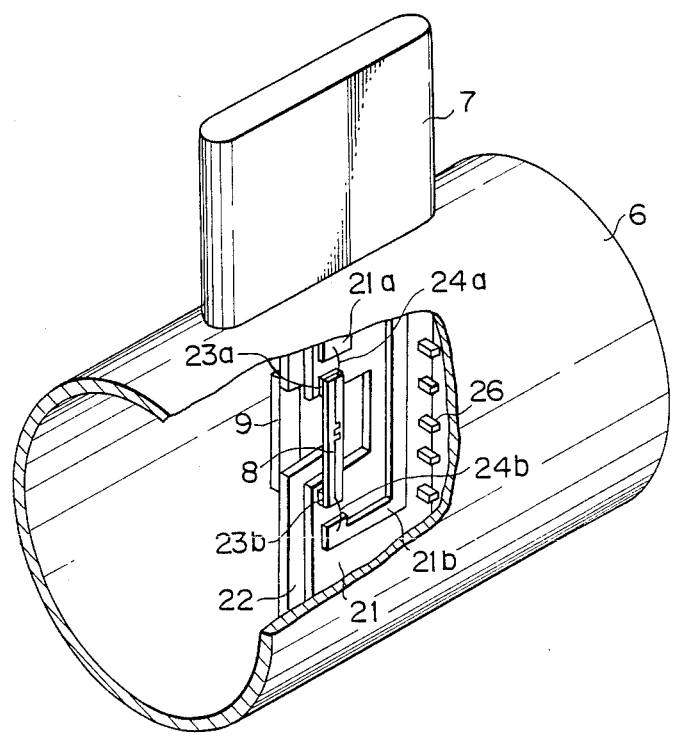

In FIG. 5, which illustrates a third embodiment of the present invention, heat dissipating fins 26 are added to the elements of FIG. 2. Thus, the heat dissipation characteristics of the supporting member 21 are also further improved, and as a result, the heat transmitted from the film resistor 8 via the adiabatic members 23a and 23b as the heat transfer throttling portions to the supporting member 21 is promptly dissipated into the airstream. Therefore, heat transmitted via the duct 6 and the stay 7 to portions other than the airstream is further remarkably reduced.

Note that, in order to make the transient temperature characteristics of the system of the film resistor 8 conform with those of the system of the temperature-compensating resistor 9, the same number of heat dissipating fins (not shown) are also provided at symmetrical positions in the supporting member 22 by which the temperature-compensating resistor 9 is supported.

Further, the second embodiment as shown in FIG. 4 and the third embodiment as shown in FIG. 5 in combination can be applied to a flow measuring apparatus. That is, in order to improve the heat dissipation characteristics of the supporting members, it is possible to provide both the heat dissipating apertures and the heat dissipating fins in the supporting members.

Note that, as illustrated in FIGS. 3-5, a part of the substrate of the film resistor 8 which is adhered to the adiabatic member 23A or 23B, and a part of the supporting member 21 adhered to the adiabatic member 23A or 23B, have the same cross-sectional outline as the adiabatic member 23A or 23B. This cross-sectional outline is a smaller area than that of the superposed surfaces between the film resistor substrate 8 and the supporting member 21.

Figure 6:
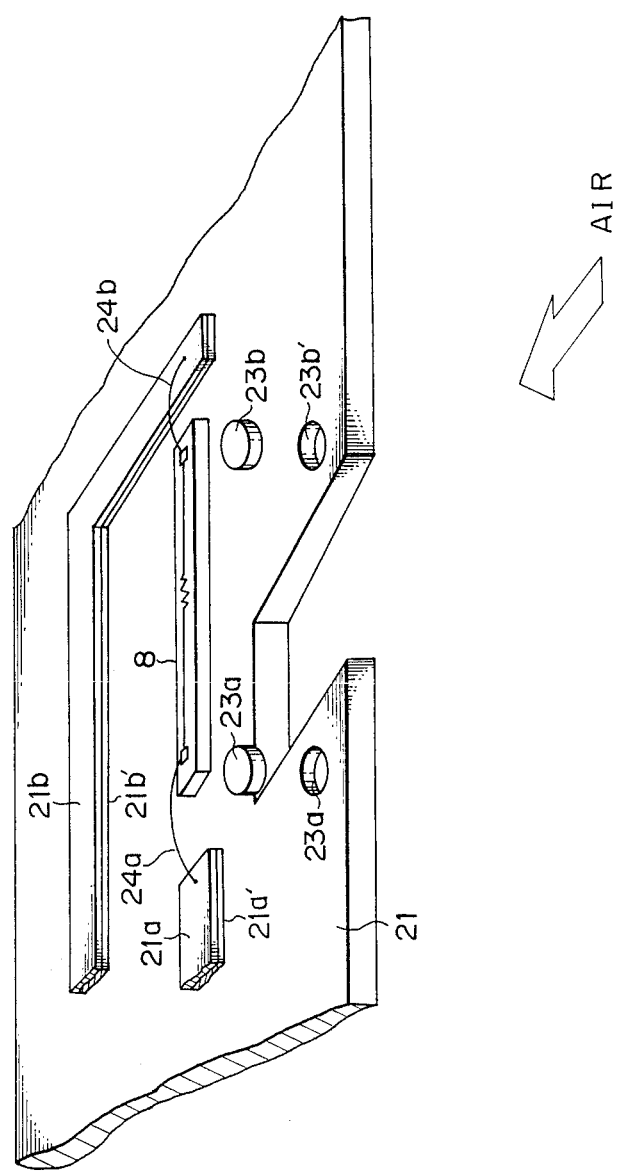
FIG. 6 is an exploded, perspective view of the film resistor and, its supporting member of FIG. 3.
Figure 7:
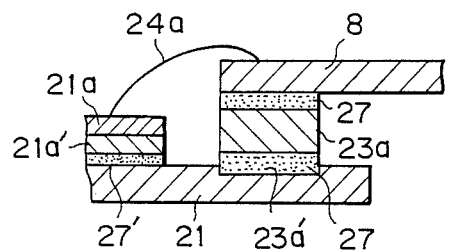
FIG. 7 is a cross-sectional view of the bonding portion of the film resistor and its supporting member of FIG. 3.

FIG. 6 is an exploded perspective view of the film resistor 8 and the supporting member 21 of FIG. 3, and FIG. 7 is a partial cross-sectional view for explaining the bonding method of the film resistor 8 and the supporting member 21 of FIG. 3. As illustrated in FIG. 6, positioning holes 23a' and 23b' for the adiabatic members 23a and 23b are formed in advance in the supporting member 21 made of aluminium or copper, and as shown in FIG. 7, adhesives 27 are coated on both surfaces of the adiabatic member 23a (23b), so that the film resistor 8 is fixed to the supporting member 21. Also, in FIG. 6, provided on the under surface of the electrodes 21a and 21b are insulating layers 21a' and 21b' of such as polyimid resin, so that the electrodes are electrically insulated from the supporting member 21, and as shown in FIG. 7, the electrodes 21a (21b) are fixed by adhesives 27' to the supporting member 21. As is apparent from FIGS. 6 and 7, each of the adiabatic members 23a and 23b has a smaller capacity than the substrate 8 and the supporting member 21.

Note that the adhesives 27 and 27' are heat-resistant resin.

FIG. 6 shows the cross-sectional of the adiabatic member 23A/23B having a smaller section than of the superposed surfaces between the film resistor substrate 8 and the supporting member 21.

Figure 8:
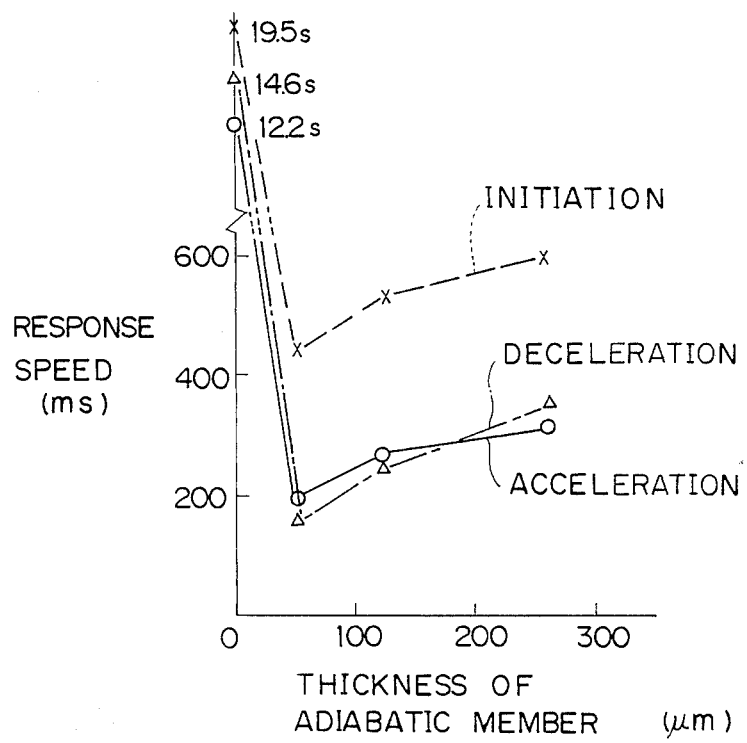
FIG. 8 is a diagram showing the characteristics of the adiabatic, member of FIGS. 3, 4, and 5.

FIG. 8 is a diagram showing the response characteristics of the adiabatic members of FIGS. 3 to 5. For the adiabatic members 23a and 23b, their adiabatic effect should be increased and their heat mass should be decreased. In view of this, as explained above, the adiabatic members are made by using material such as polyimid resin, and the like having a small thermal conductivity and a small specific heat. Also, the thickness of the adiabatic members is an important parameter. That is, as shown in FIG. 8, as the thickness of the adiabatic members 23a and 23b increases, the heat mass increases, thereby deteriorating the response characteristics although the adiabatic effect is increased. Contrary to this, as the thickness of the adiabatic members 23a and 23b decreases, the adiabatic effect decreases thereby deteriorating the response characteristics, although the heat mass is decreased. As illustrated in FIG. 8, where the adiabatic members 23a and 23b use polyimid resin, their thickness is preferably 50 to 60 $\mu$m.

Figure 9A:
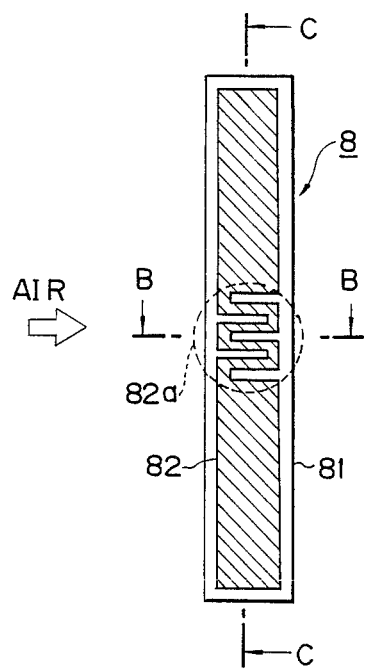
FIG. 9A is a plan view of an example of the film resistor of FIGS. 3, 4, and 5.
Figure 9C:
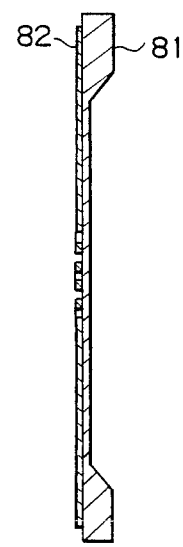
FIGS. 9B and 9C are cross-sectional views taken along the lines B-C and C-C, respectively, of FIG. 9A.
Figure 9B:
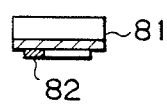

The film resistor of FIGS. 3 to 5 will be explained with reference to FIGS. 9A to 9C. Note that FIGS. 9B and 9C are cross-sectional views taken along the lines B-B and C-C, respectively, of FIG. 9A. As shown in FIG. 9A, an insulating layer such as silicon dioxide ($SiO_2$), which is not shown, is evaporated and is etched on a monocrystalline silicon substrate 81 having a thickness of 200 to 400 $\mu$m, thereby obtaining a film resistance pattern 82 which has a portion 82a indicated by a dotted frame serving as a heating and temperature-detecting portion. Note that the thickness of the silicon substrate 81 on the heating and temperature-detecting portion 82a is very thin as shown in FIGS. 9B and 9C, thereby decreasing the heat mass thereof.

In the embodiments of FIGS. 3 to 5, although the throttling of the heat transfer is carried out by the adiabatic member 23a and 23b, it can be carried out by reducing the width of the heat passage of the substrate of the film resistor 8. Examples of this are illustrated in FIGS. 10A to 10C, and FIGS. 11A to 11C. Note that, in this case, since the adiabatic members can be deleted, the electrical connections between the film resistor 8 and the electrodes 21a and 21b can be carried out directly and not by bonding wires.

FIG. 10A shows another example of the film resistor 8, and FIGS. 10B and 10C are cross-sectional views taken along the lines B-B and C-C, respectively, of FIG. 10A. As shown in FIG. 10A, an insulating layer such as $SiO_2$, which is not shown, is evaporated and is etched on a monocrystalline silicon substrate 81', thereby obtaining a film resistance pattern 82' which has a portion 82'a indicated by a dotted frame serving as a heating and temperature-detecting portion.

Formed on the sides of the heating and temperature-detecting portion 82'a are apertures 83'a and 83'b, thereby imposing the throttling of the heat transfer upon the heating and temperature-detecting portion 82'a, thus increasing the adiabatic effect thereof. Further, the thickness of the silicon substrate 81' on the heating and temperature-detecting portion 82'a is very thin as shown in FIGS. 10B and 10C, thereby decreasing the heat mass thereof. Note that reference 81'a designates a trap for trapping suspended particles or the like.

Figure 11A:
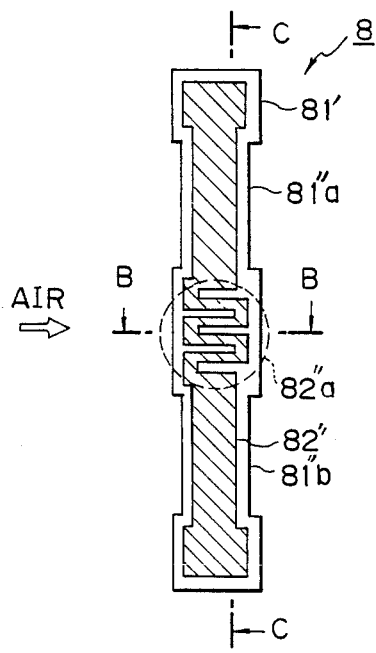
FIG. 11A is a plan view of a further example of the film resistor of FIGS. 3, 4, and 5.
Figure 11C:
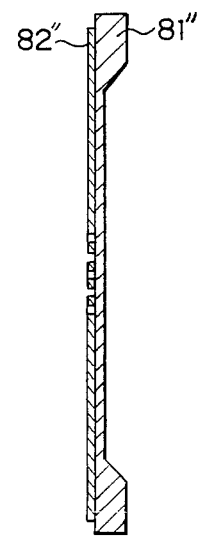
FIGS. 11B and 11C are cross-sectional views taken along the lines B-C and C-C, respectively, of FIG. 11A.
Figure 11B:
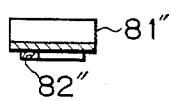

FIG. 11A shows still another example of the film resistor 8, and FIGS. 11B and 11C are cross-sectional views taken along the lines B-B and C-C, respectively, of FIG. 11A. Also in FIGS. 11A to 11C, on a monocrystalline silicon substrate 81'', a film resistor 82'' is formed by evaporating and etching an insulating layer such as $SiO_2$, which is not shown, and the portion 82''a indicated by a dotted frame serving as a heating and temperature-detecting portion.

The substrate portions 81''a and 81''b on the sides of the heating and temperature-detecting portion 82''a is narrow when compared with the portion 82″a so that a throttle for the heat transfer is formed, thereby increasing the adiabatic effect of the heating and temperature-detecting portion 82″a. In the same way as in FIGS. 10A to 10C, the thickness of the silicon substrate 81″ on the heating and temperature-detecting portion 82″a is very thin as shown in FIGS. 11B and 11C, thereby decreasing the heat mass thereof.

Figure 12A:
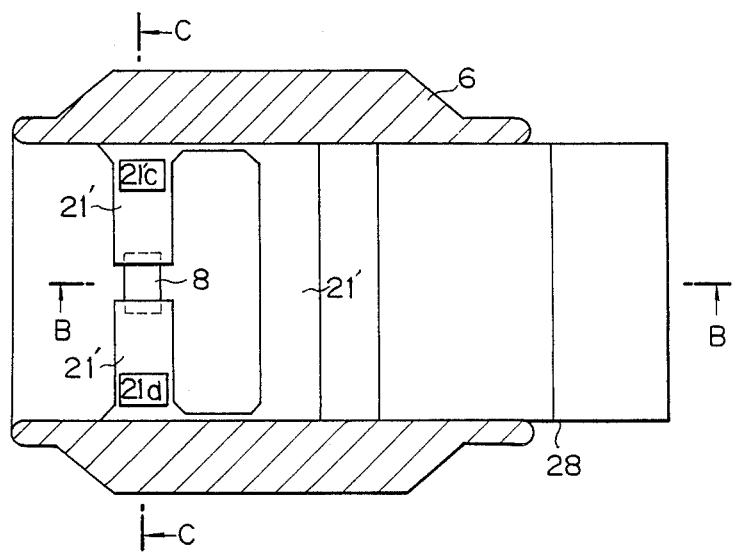
FIG. 12 is a plan view illustrating a fourth embodiment of the direct-heated flow measuring apparatus according to the present invention.
FIGS. 12B and 12C are cross-sectional views taken along the lines B-C and C-C, respectively, of FIG. 12A.
Figure 12B:
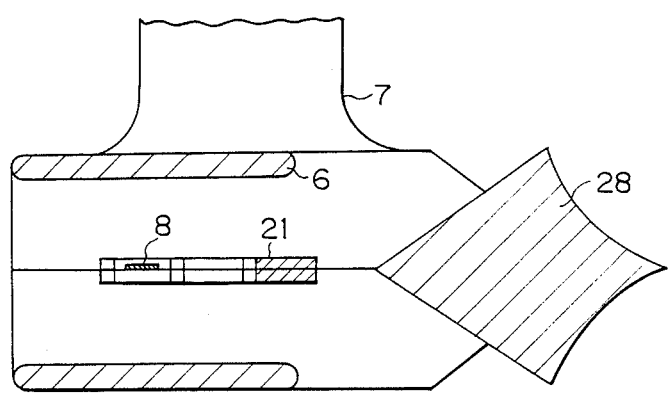
Figure 12C:
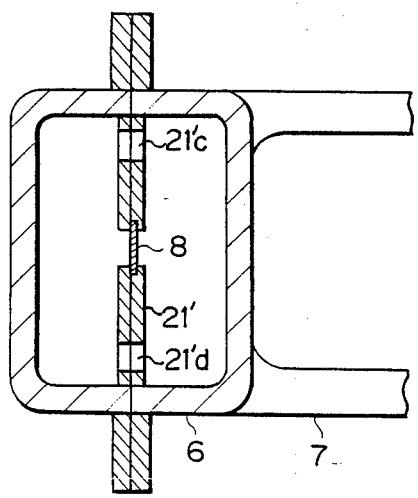

In FIGS. 12A, 12B, and 12C, which illustrate a fourth embodiment of the present invention, the film resistor 8 is fixed to a supporting member 21′ having good heat dissipation characteristics, which has apertures 21′c and 21′d for the throttling of the heat transfer. Also, in this case, the throttling of the heat transfer is carried out by adiabatic members or by reducing the width of the heat passage of the substrate. Therefore, in the same way as in the above-mentioned embodiments, most of the heat generated from the film resistor 8 is dissipated from the film resistor 8 itself into the airstream, and one part of it is transmitted via the throttling portion of heat transfer to the supporting member 21′. However, this part is also dissipated into the airstream. In this case, since the throttling of the heat transfer is also imposed on the supporting member 21′, the heat generated by the film resistor 8 transmitted via the duct 6 and the stay 7 to portions other than the airstream is further reduced. Note that reference numeral 28 designates a protector against backfiring.

Figure 13A:
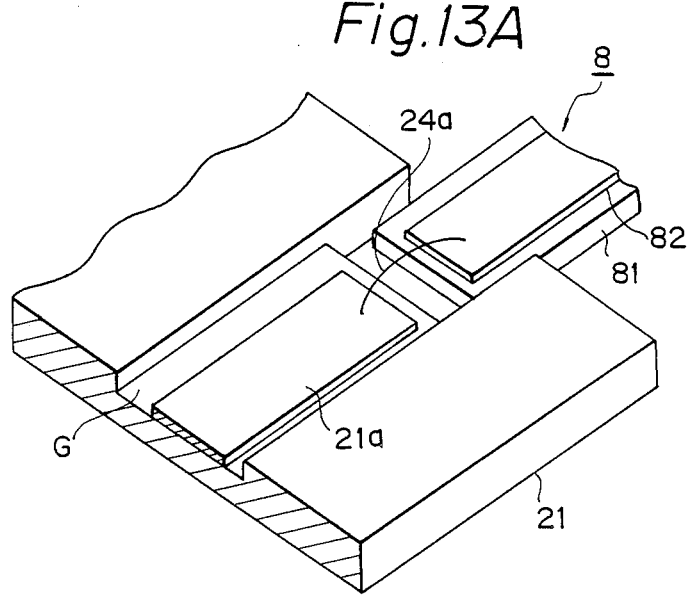
FIGS. 13A and 13B are perspective views of modifications of the, bonding portion of the film resistor and its supporting member of FIG. 6.

FIG. 13A is a modification of the film resistor 8 and its supporting member of FIG. 6. That is, the electrode 21a is provided in a recess formed within the supporting member 21. In this case, if the size of the adiabatic member 23a is reduced while sufficiently maintaining the retentive force of the film resistor 8, the heat mass of the adiabatic member 23a is reduced.

Figure 13B:
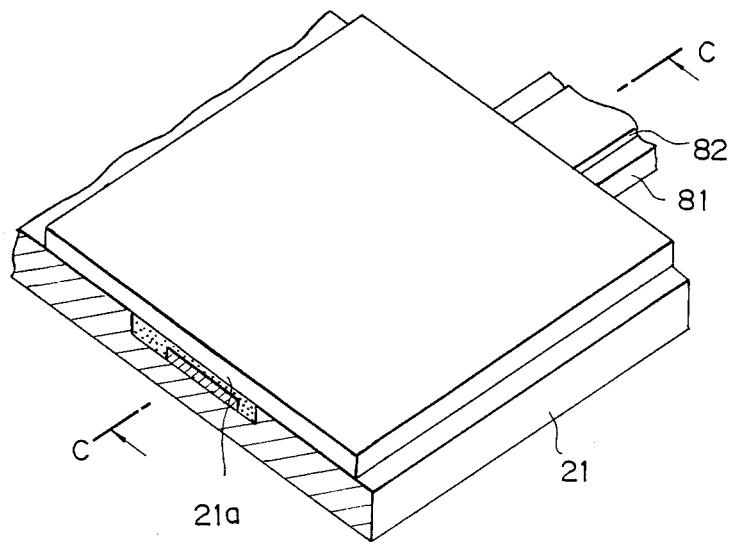
Figure 13C:
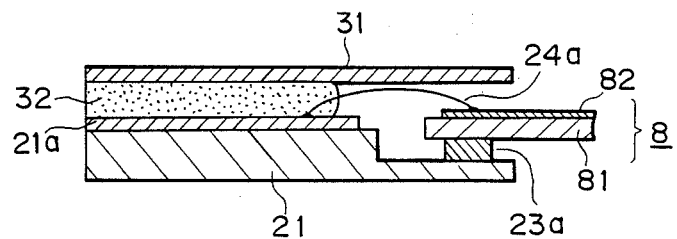
FIG. 13C is a cross-sectional view taken along the line C-C of FIG. 13B.

In FIG. 13B, which is also a modification of FIG. 6, and FIG. 13C, which is a cross-sectional view taken along the line C-C of FIG. 13B, in order to protect the electric conductive wire 24a against backfiring or the like, and to prevent it from being stained, a cover 31 and a mold resin 32 are added to the elements of FIG. 13A.

The assembling of the portion as shown in FIGS. 13B and 13C is carried out as follows. The film resistor 8 is fixed by the adiabatic member 23a coated by adhesives to the supporting member 21, and the wire 24a is made by wire bonding. Then, after imposing the mold resin 32 onto the supporting member 21, the protection cover 31 is attached thereto, thus completing the assembly of the portion as shown in FIGS. 13B and 13C.

Figure 13D:
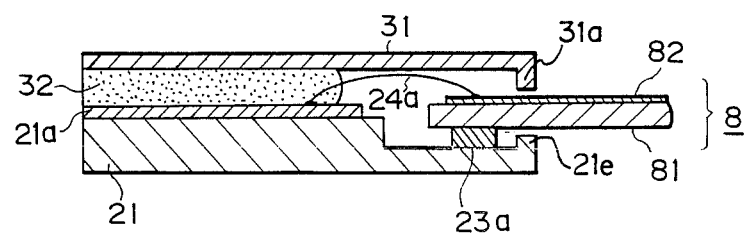
FIGS. 13D and 13E are modifications of FIG. 3C.

In FIG. 13D, which is a modification of FIG. 13C, the supporting member 21 and the cover 31 has curls (curled edges) 21e and 31a at their ends, thereby effectively carrying out the protection of the electric conductive wire 24a against backfiring and preventing the wire 24a from being stained by depositions.

Figure 13E:
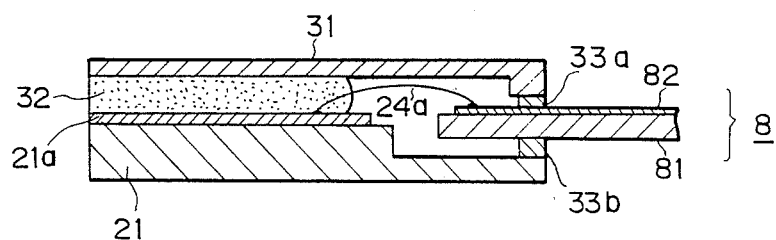

In FIG. 13E, which is a modification of FIG. 13D, the film resistor 8 is fixed by two adiabatic members 33a and 33b to the cover 31 as well as the supporting member 21, thereby further effectively carrying out the protection of the electric conductive wire 24a against backfiring and preventing the wire 24a from being stained by depositions.

Figure 14:
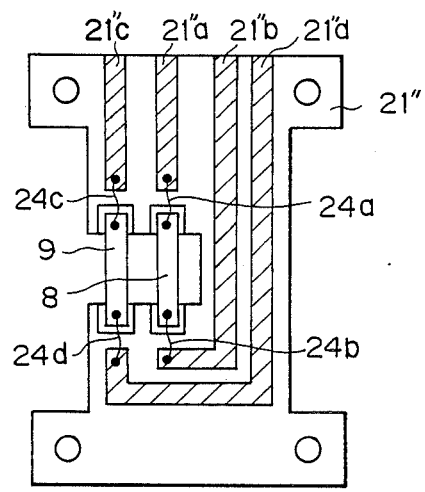
FIG. 14 is a side view illustrating a fifth embodiment of the direct-heated flow measuring apparatus according to the present invention.

In FIG. 14, which illustrates a fifth embodiment of the present invention, the film resistor 8 is in proximity to the temperature-compensating resistor 9, and the temperature-compensating resistor 9 is provided upstream of the film resistor 8. That is, the film resistor 8 and the temperature-compensating resistor 9 are adhered onto the same supporting member 21″, so that the system of the film resistor 8 and the system of the temperature-compensating resistor 9 have the same heat capacity, and accordingly, the transient temperature characteristics of the system of the film resistor 8 are the same as those of the system of the temperature-compensating resistor 9. As a result, the fluctuation of the difference in temperature between the film resistor 8 and the temperature-compensating resistor 9 during a transient state is also small, and accordingly, an error in the measured flow rate is small.

Note that in FIG. 14, since the temperature-compensating resistor 9 is provided upstream of the film resistor 8, the heat generated by the film resistor 8 has little affect on the temperature-compensating resistor 9.

Figure 15:
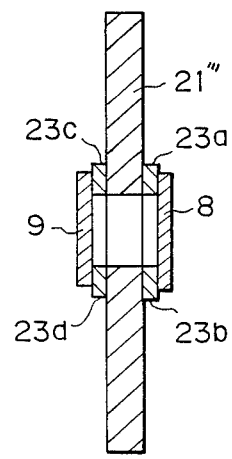
FIG. 15 is a cross-sectional view illustrating a sixth embodiment of the direct-heated flow measuring apparatus according to the present invention.

In FIG. 15, which illustrates a sixth embodiment of the present invention, only one supporting member 21″ is provided, and the film resistor 8 and the temperature-compensating resistor 9 are adhered to the front and back, respectively, thereof. As a result, the system of the film resistor 8 and the system of the temperature-compensating resistor 9 have the same heat capacity, and accordingly, the transient temperature characteristics of the system of the film resistor 8 are the same as those of the system of the temperature-compensating resistor 9. As a result, the fluctuation of the difference in temperature between the film resistor 8 and the temperature-compensating resistor 9 during a transient state is also small, and accordingly, an error in the measured flow rate is small.

Note that in FIG. 15, since the film resistor 8 and the temperature-compensating resistor 9 are provided on opposite sides to each other, the heat generated by the film resistor 8 has little affect on the temperature-compensating resistor 9.

Figure 16A:
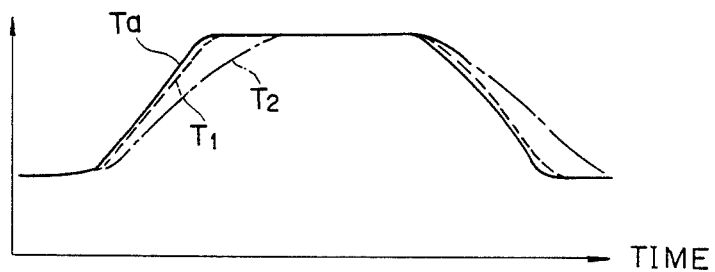
FIGS. 16A, 16B, 17A, and 17B are timing diagrams for explaining the effect of the present invention.
Figure 16B:
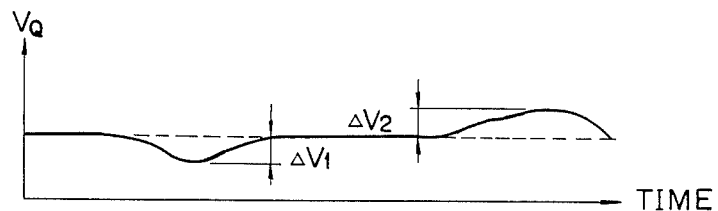
Figure 17A:
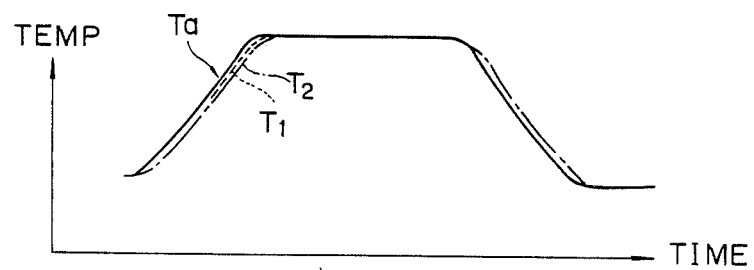
Figure 17B:
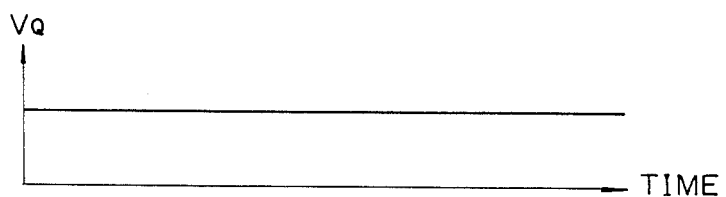

As shown in FIGS. 16A and 16B, in the prior art, when the film resistor 8 and the temperature-compensating resistor 9 are positioned at quite different places, the change of the temperature $T_1$ of the film resistor 8 is different from the change of the temperature of the temperature-compensating resistor 9, where the ambient temperature Ta is changed. Note that FIG. 16A shows the case wherein no current is supplied to the film resistor 8. That is, at the rise of the ambient temperature Ta, the temperature $T_1$ of the film resistor 8 rises quickly as compared with the temperature $T_2$ of the temperature-compensating resistor 9, so that the heat generated by the film resistor 8 is reduced. Therefore, in order to obtain a definite difference in temperature, the output $V_Q$ is reduced by $\Delta V_1$ as indicated by FIG. 16B. On the other hand, at the fall of the ambient temperature Ta, the temperature $T_1$ of the film resistor 8 falls quickly as compared with the temperature $T_2$ of the temperature-compensating resistor 9, so that the heat generated by the film resistor 8 is increased. Therefore, in order to obtain a definite difference in temperature, the output $V_Q$ is increased by $\Delta V_2$ as indicated by FIG. 16B. Contrary to this, according to the present invention, the change of each of the film resistor 8 and the temperature-compensating resistor 9 is the same as shown in FIG. 17A, and accordingly, no error of the output $V_Q$ is generated, as shown in FIG. 17B.

In the above-mentioned embodiments, although the substrate of the film resistor 8 uses monocrystalline silicon, ceramic or glass also can be used. Also, although a resistance pattern as the heating and temperature-detecting portion is formed on a monocrystalline silicon substrate, a diffusion resistor can be formed within the monocrystalline silicon substrate. Also, corrosion-proof metal can be used as the above-mentioned electrodes (sheets) 21a (21b) and the electric conductive wire 24a (24b). For example, the electrodes use Au, Pt, or the like, and the electric conductive wire uses Au. Further, although both of the ends of the film resistor (or the temperature-compensating resistor) are supported by the same supporting member, only one end thereof can be supported thereby, and each end can be supported by separate supporting members. The present invention can be applied to flow rate sensors other than airflow sensors, such as liquid flow rate sensors.

The present invention can be also applied to a digital (pulse) type flow rate sensor controlled by a trigger pulse. That is, in this sensor when such a trigger pulse is given to initiate heating of a heater resistor. Then, the heating of the heater resistor continues until a constant difference in temperature between two temperature-dependent resistors is generated, or until the downstream temperature-dependent resistor reaches a constant value. In this case, the heating time period is detected as the mass flow rate of air or the volume flow rate of air. Such a trigger pulse control has an advantage in that the power dissipation is good. Note that such trigger pulse control is possible in a direct-heated rate sensor.

As explained above, according to the present invention, the heat transmitted to the supporting member can be positively dissipated via the supporting member having a good heat dissipation characteristics to the fluid such as air, and as a result, the heat transmitted to the supporting member becomes promptly stable, thereby improving the response characteristics of the flow measuring apparatus. Also, the heat loss of the substrate, on which the film resistor is formed, is reduced, thereby improving the accuracy of flow rate detection. Further, the fluctuation of the difference in temperature between the film resistor and the temperature-compensating resistor during a transient state can be small, and accordingly, an error in the measured flow rate can be small.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:
1. A direct-heated flow measuring apparatus for measuring the flow rate within a passage comprising;
    a planar substrate that is formed of monocrystalline silicon;
    a film resistance pattern formed partially at said substrate;
    a supporting plate, fixed to said passage, for supporting said substrate, said supporting plate having good heat dissipation characteristics;
    at least one adiabatic member disposed between said substrate and said supporting plate; and
    electric power control means, connected to said film resistance pattern, for controlling the heat generated by said film resistance pattern,
    one part of a surface of said planar substrate and one part of a surface of said supporting plate being superimposed on each other via said adiabatic member, the cross-section of said adiabatic member being smaller than the superimposed area of said planar substrate and said supporting plate.

2. An apparatus as set forth in claim 1, wherein apertures are provided in said supporting member.

3. An apparatus as set forth in claim 1, wherein fins for dissipating heat are provided in said supporting plate.

4. An apparatus as set forth in claim 1, wherein said supporting plate is made of a material having a relatively larger thermal conductivity than a thermal conductivity of said adiabatic member.

5. An apparatus as set forth in claim 4, wherein said material is metal.

6. An apparatus as set forth in claim 5, wherein said metal is one of aluminium and copper.

7. An apparatus as set forth in claim 1, wherein said adiabatic member is inserted between an edge of said supporting plate and said substrate.

8. An apparatus as set forth in claim 1, wherein said resistance pattern is formed on said monocrystalline silicon.

9. An apparatus as set forth in claim 1, wherein a diffusion resistance is formed as said film resistance pattern in said monocrystalline silicon.

10. An apparatus as set forth in claim 1, further comprising a temperature-compensating resistor for detecting the temperature of non-heated fluid in the fluid stream, said temperature-compensating resistor being substantially unaffected by the heat generated from said film resistance pattern, said electric power control means controlling the heat generated by said film resistance pattern and said temperature-compensating resistor.

11. An apparatus as set forth in claim 10, wherein a system of said temperature-compensating resistor has the same configuration as a system of said film resistance pattern, the system of said temperature-compensating resistor being symmetrical to the system of said film resistance pattern with respect to the fluid stream.

12. An apparatus as set forth in claim 11, wherein the system of said temperature-compensating resistor comprises a supporting means different to the system of said film resistance pattern.

13. An apparatus as set forth in claim 11, wherein the system of said temperature-compensating resistor comprises the same supporting means as the system of said film resistance pattern.

14. An apparatus as set forth in claim 10, wherein a system of said temperature-compensating resistor has the same configuration as a system of said film resistance pattern, the system of said temperature-compensating resistor being disposed upstream of the system of said film resistance pattern.

15. An apparatus as set forth in claim 14, wherein the system of said temperature-compensating resistor comprises the same supporting means as the system of said film resistance pattern.

16. An apparatus as set forth in claim 1, wherein said adiabatic member is made of an insulating material.

17. An apparatus as set forth in claim 16, further comprising:
    an electrode formed on said supporting plate and connected to said control means; and
    an electric conductive wire, formed by wire bonding, for connecting said electrode to said film resistance pattern.

18. An apparatus as set forth in claim 17 further comprising means for covering said electric conductive wire.

19. An apparatus as set forth in claim 18, wherein said covering means has at least a curled edge to protect said electric conductive wire.

20. An apparatus as set forth in claim 18, further comprising an adiabatic member inserted between said covering means and said substrate.

21. An apparatus set forth in claim 1, wherein said supporting plate supports at least one end of said substrate by said adiabatic member.

22. A measuring apparatus as in claim 1 wherein said adiabatic member is partially in contact with both said planar substrate and said supporting plate at a portion other than a portion of said planar substrate where said film resistance pattern is formed.

23. A direct-heated flow measuring apparatus for measuring the flow rate with passage comprising:
a planar substrate that is formed of monocrystalline silicon;
a film resistance pattern formed partially at said substrate;
a supporting plate, fixed to said passage, for supporting said substrate, said supporting plate having good heat dissipation characteristics;
at least one adiabatic member disposed between said substrate and said supporting plate; and
electric power control means, connected to said film resistance pattern, for controlling the heat generated by said film resistance pattern,
said adiabatic member being partially in contact with both said planar substrate and said supporting plate at a portion other than a portion of said planar substrate where said film resistance pattern is formed, wherein a material of said adiabatic member is polyimid resin, and wherein said polyimid resin has a thickness of 50 to 60 $\mu$m.

24. A direct-heated flow measuring apparatus for measuring the flow rate within a passage comprising:
a planar substrate that is formed of monocrystalline silicon;
a film resistance pattern formed at a central portion of said substrate;
a supporting plate, fixed to said passage, for supporting at least one end of said substrate, said supporting plate having good heat dissipation characteristics;
means for throttling heat transfer between said substrate and said supporting plate; and
electric power control means, connected to said film resistance pattern, for controlling the heat generated by said film resistance pattern,
wherein holes are provided in said supporting plate, said heat transfer throttling means comprising adiabatic chips fixed to said holes, said substrate being fixed to said chips.

25. A direct heated flow measuring apparatus for measuring the flow rate within a passage, comprising:
a planar substrate that is formed of monocrystalline silicon;
a film resistance pattern formed at the central portion of said substrate;
a supporting plate fixed to said passage, for supporting at least one end of said substrate, said supporting plate being made of a metal material having a relatively larger thermal conductivity than a thermal conductivity of an adiabatic member;
said adiabatic member between said substrate and said supporting plate, for throttling heat transferred between said substrate and said supporting plate; and
electric power control means, connected to said film resistance pattern, for controlling the heat generated by said film resistance pattern.

* * * * *